Patented Dec. 4, 1923.

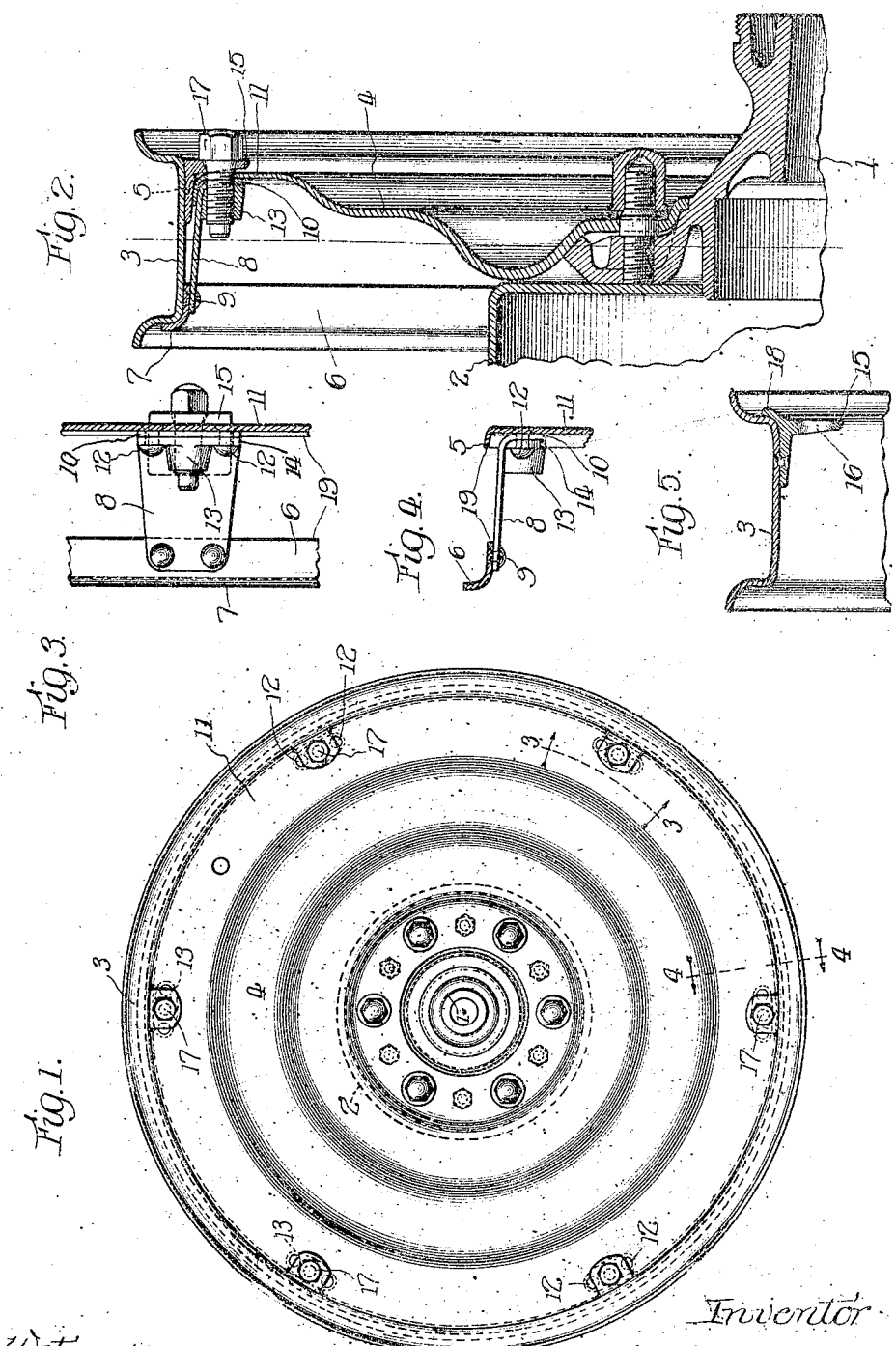

1,476,130

UNITED STATES PATENT OFFICE.

WILLIAM ERASTUS WILLIAMS, OF WILMETTE, ILLINOIS, ASSIGNOR TO AMERICAN STEEL FOUNDRIES, OF CHICAGO, ILLINOIS, A CORPORATION OF NEW JERSEY.

METAL DISK WHEEL.

Application filed September 27, 1922. Serial No. 590,953.

*To all whom it may concern:*

Be it known that I, WILLIAM ERASTUS WILLIAMS, a citizen of the United States, and a resident of Wilmette, county of Cook, State of Illinois, have invented a new and useful Improvement in Metal Disk Wheels, of which the following is a specification.

The object of my invention is to produce a wheel adapted to carry a demountable rim of the split rim type and provide a wheel of simple construction which is unusual in strength and lightness.

Reference will be had to the accompanying drawing, in which

Figure 1 is a front elevation of the wheel.

Figure 2 is a transverse sectional elevation of one-half of the wheel.

Figure 3 is a sectional view on the line 3—3 of Figure 1 looking outward from the hub toward the rim.

Figure 4 is a cross section of the rim on the line 4—4 of Figure 1.

Figure 5 is a transverse section of the rim only, being similar to the section shown in Figure 2.

In the drawing 1 indicates the hub of an automobile wheel, here shown as a rear wheel hub, 2 indicates the ordinary brake drum, 3 indicates a type of split rim commonly in use and 4 indicates the disk forming the web of the wheel, which is suitably fastened to the hub and provided with the marginal flange 5 seated underneath the outer side of the rim 3. A ring 6, having a flange 7, supplements the flange of the disk and forms the inside tread portion of the wheel. This flange ring 6 is connected across to the margin of the disk 4 by a series of cross plates 8, which are connected by rivets 9 to the ring 6 and have the outer ends 10 turned over in contact with the front face 11 of the felloe portion of the disk 4 and are secured by the rivets 12 to the disk. A series of nuts 13, having flanges 14, are also secured to this face 11 of the disk by the said rivets 12, thus the ends 10 of the cross plates 8 are clamped by the rivets 12 in between the fixed nuts 13 and the face 11 of the disk.

Fixed to the rim 3 and carried therewith is a series of lugs 15, having holes 16 through which a series of screws 17 pass into the fixed nuts 13 and thus secure the rim to the tread of the wheel.

In place of the lugs 15 being fixed to the rim of the wheel I may provide loose clips instead, and provide the clips with shoulders 18, see Figure 5, that will act as a wedge holding the rim 3 onto the tread of the wheel.

By the construction shown I save the weight of the metal which normally might cover the gap between the ring 6 and the inside edge 5 of the disk, excepting the surfaces occupied by the plates 8, and this gap is indicated by 19, Figures 3 and 4.

What I claim is:—

1. In a wheel of the class described, a disk forming the support of one side of a demountable rim and a ring forming the support for the other side, and the two connected together by a series of cross plates.

2. In a wheel of the class described, a disk forming one region of support for the rim of a wheel, a secondary ring spaced from the margin of the disk and connected across to the disk by a series of connecting members.

3. In a device of the class described, a disk forming the web of a wheel and marginally adapted for the attachment of a rim, in combination with a supplemental ring forming a support for part of the rim and means for connecting the supplemental ring to the disk.

4. In a wheel of the class described, the combination with a disk adapted to carry a demountable rim, of a supplemental supporting ring connected to the disk at intervals about its periphery and a series of fixed nuts and screws secured to the margin of the disk and adapted to hold a demountable rim to the tread of the wheel as described.

5. In a device of the class described, the main disk forming the web of the wheel, a supplemental supporting ring for a rim spaced asunder from the disk and connected thereto by a series of plates secured to the supplemental ring and to the disk.

6. In a device of the class described, a wheel adapted to carry a demountable rim and provided with a tread portion on one side in the form of a disk and on the other side in the form of a ring spaced asunder from the disk and permanently connected across to the disk.

7. In a device of the class described, a tread portion of a wheel having two concentric bearing edges adapted to furnish a bearing support for a demountable rim on the inside and outside edges thereof and spaced asunder, and the two bearing edges connected across at intervals only, in combination with means for holding a demountable rim on the said edges.

Signed at Chicago in the county of Cook and State of Illinois, this 25th day of September, 1922.

WILLIAM ERASTUS WILLIAMS.

Witnesses:
 B. J. BERNHARD,
 JOS. E. LOVE.